United States Patent [19]

Matsushita et al.

[11] Patent Number: 5,367,239

[45] Date of Patent: Nov. 22, 1994

[54] PRINTER CARRIER DRIVING METHOD

[75] Inventors: Tsuyoshi Matsushita; Eiichi Furuya; Narumi Kikuchi; Katsuya Endo; Yutaka Wada, all of Shizuoka, Japan

[73] Assignee: Tokyo Electric Co., Ltd., Tokyo, Japan

[21] Appl. No.: 866,367

[22] Filed: Apr. 10, 1992

[30] Foreign Application Priority Data

Apr. 12, 1991 [JP] Japan .................. 3-79535

[51] Int. Cl.[5] .......................... G05B 19/04
[52] U.S. Cl. .......................... 318/685; 318/135; 318/270; 318/696; 388/904; 400/903
[58] Field of Search .............. 318/685, 35, 65, 135, 318/567, 268–272, 696; 388/904; 400/120, 279, 292, 322, 903

[56] References Cited

U.S. PATENT DOCUMENTS

| | | | |
|---|---|---|---|
| 3,965,403 | 6/1976 | Okado | 318/143 |
| 4,320,330 | 3/1982 | Bahr et al. | 318/685 |
| 4,461,984 | 7/1984 | Whitaker et al. | 318/687 |
| 4,469,995 | 9/1984 | Chiang et al. | 318/685 |
| 4,489,267 | 12/1984 | Saar et al. | 318/811 |
| 4,490,796 | 12/1984 | Bigbie et al. | 318/561 X |
| 4,546,443 | 10/1985 | Oguchi et al. | 364/513 |
| 4,648,026 | 3/1987 | Petrick | 318/685 |
| 4,777,609 | 10/1988 | Cavill et al. | 364/519 |
| 4,833,372 | 5/1989 | Kobayashi et al. | 318/696 |
| 4,843,409 | 6/1989 | Matsuzaki | 346/76 PH |
| 4,846,597 | 7/1989 | Bryant et al. | 400/472 |
| 4,884,016 | 11/1989 | Aiello | 318/685 |
| 4,908,556 | 3/1990 | Daggett et al. | 318/568.2 |
| 4,982,146 | 1/1991 | Moteki | 318/696 |
| 5,191,356 | 3/1993 | Shibamiya | 346/76 PH |
| 5,225,757 | 7/1993 | Burke | 318/696 |

FOREIGN PATENT DOCUMENTS 6359791 8/1961 Japan .

Primary Examiner—William M. Shoop, Jr.
Assistant Examiner—Brian Sircus
Attorney, Agent, or Firm—Oblon, Spivak, McClelland, Maier & Neustadt

[57] ABSTRACT

Disclosed is a method for driving a printer carrier. One power source is connected via a constant current circuit to the carrier motor. Data storing means stores the current command data corresponding to the acceleration, constant speed printing and deceleration of the carrier motor. According to the method, the current command data from the data storing means is latched in synchronism with a clock signal. The latched data is converted to a current reference voltage. The output current of the constant current drive circuit is varied in accordance with the current reference voltage. Changing the current command data as desired makes it possible to adjust freely the torque of the carrier motor for acceleration and deceleration on a constant voltage from one power source.

7 Claims, 4 Drawing Sheets

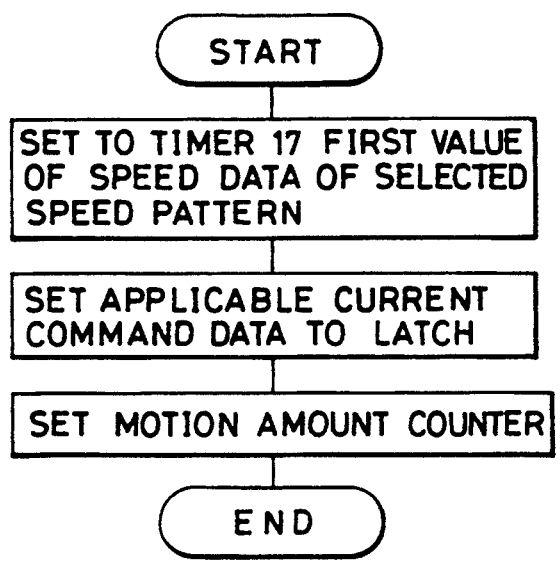
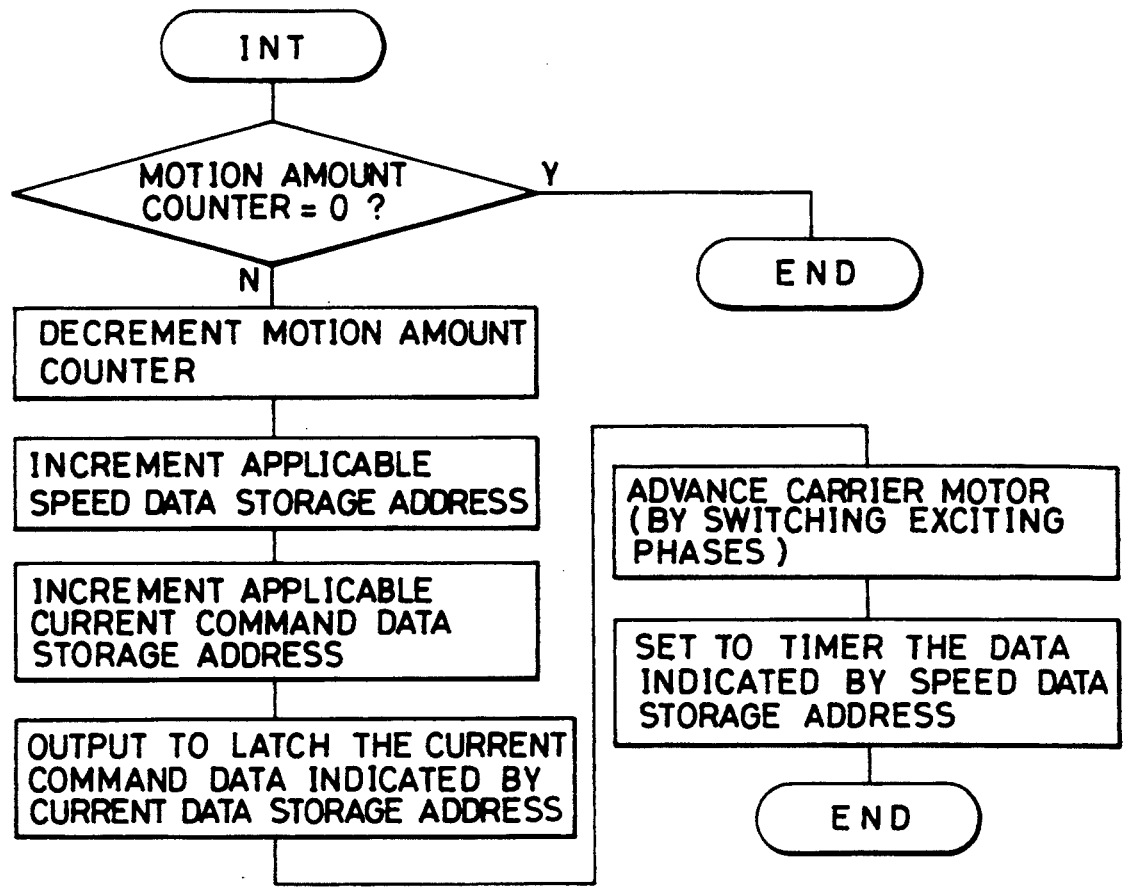

PRINTER CARRIER DRIVING METHOD

FIELD OF THE INVENTION AND RELATED ART STATEMENT

The present invention relates to a printer carrier driving method.

Japanese Patent Laid-Open No. Sho 63-59791 discloses a method that utilizes transistor switching action to connect selectively a stepping motor to one of different power sources of different voltages. This method raises the current fed to the stepping motor upon acceleration or deceleration, and lowers the current thereto during constant speed printing.

The method proposed above accelerates or decelerates the stepping motor over a short time in short steps. One disadvantage of this method is that there is a practical limit to the number of switchable current settings because the current to the stepping motor is determined by the voltage of the power source connected therewith. That is, the greater the number of current settings, the greater the number of power sources of different voltages to be furnished for supply to the stepping motor. This can complicate the circuit arrangement involved.

OBJECT AND SUMMARY OF THE INVENTION

It is therefore an object of the present invention to provide a printer carrier driving method for freely adjusting the torque of a printer carrier motor for acceleration and deceleration on a constant voltage of a single power source.

It is another object of the invention to provide a printer carrier driving method for use where the speed of the printer carrier is varied in each of different printing modes for different printing densities, the method allowing the torque of the carrier motor to be set appropriately for acceleration and deceleration on the one hand, and for constant speed printing on the other, in accordance with the currently established speed of the printer carrier.

In carrying out the invention and according to one aspect thereof, there is provided a printer carrier driving method for use with a printer carrier driving apparatus comprising a printing head, a carrier carrying the printing head, a carrier motor rotating in forward and reverse directions, a constant current drive circuit, data storing means and a clock generator, the carrier being reciprocated in movement by the carrier motor, the carrier motor being connected via the constant current drive circuit with a power source, the method comprising the steps of: having the data storing means store the current command data corresponding to the acceleration, constant speed printing and deceleration of the carrier motor; latching the current command data in synchronism with the pulses generated by the clock generator; converting the latched current command data to a current reference voltage; and varying the output current of the constant current drive circuit in accordance with the current reference voltage. In operation, the current command data stored in the data storing means is latched consecutively in synchronism with the pulses from the clock generator. The latched current command data is converted to the current reference voltage. The carrier motor is driven by varying the output current of the constant current drive circuit in accordance with the current reference voltage. Changing the current command data makes it possible to adjust freely the torque of the carrier motor during its acceleration and deceleration. This means that the carrier motor is driven on a current that generates a minimally required level of torque. With the energy efficiency of the power supply thus improved, the carrier motor is protected from heating. Because the current to the carrier motor is controlled upon acceleration and deceleration, dumping is suppressed during constant speed printing. Furthermore, the inventive method minimizes the noise emanating from the stepping motion of the carrier motor during constant speed printing.

A variation of the above method involves having the data storing means store, for each of a plurality of speed patterns, the current command data corresponding to the acceleration, constant speed printing and deceleration of the carrier motor. Where the carrier speed is changed for each of different printing modes of different printing densities, this method allows the torque of the carrier motor to be set in keeping with the carrier speed during acceleration, constant speed printing or deceleration.

BRIEF DESCRIPTION OF THE DRAWINGS

FIG. 6 is a flowchart of the steps constituting a routine for starting the carrier motor; and FIG. 7 is a flowchart of the steps constituting an interrupt handling routine for operating the carrier motor.

DETAILED DESCRIPTION OF PREFERRED EMBODIMENTS

Figure 3:
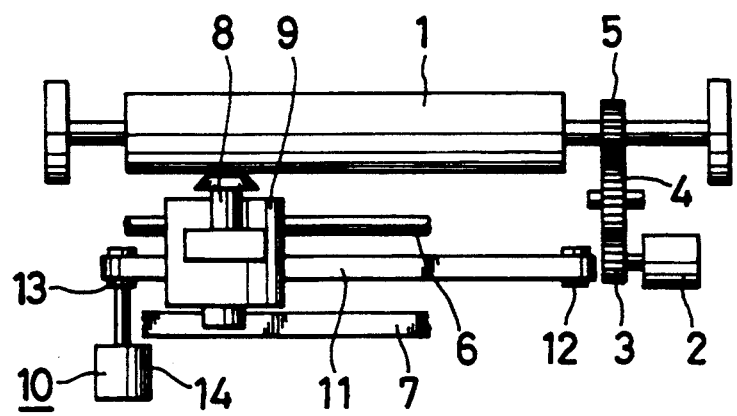
FIGS. 3 is a plan view of a printer to which the invention is illustratively applied.

A preferred embodiment of the invention will now be described with reference to the accompanying drawings. FIG. 3 depicts the structure of a printer to which the patent is illustratively applied. In FIG. 3, a rotatably supported platen 1 is connected via gears 3, 4 and 5 to a paper feed motor 2. A carrier shaft 6 and a guide rail 7, furnished in parallel to the platen 1, support slidingly a carrier 9 that carries a printing head 8. A driver 10 that drives the carrier 9 comprises an endless belt 11, a pair of rollers 12 and 13 and a carrier motor 14. Part of the belt 11 is fixed to the carrier 9. The belt 11 is wound around the rollers 12 and 13, the latter roller being coupled direct to the carrier motor 14. The carrier motor 14 is typically a four-phase stepping motor.

Figure 1:
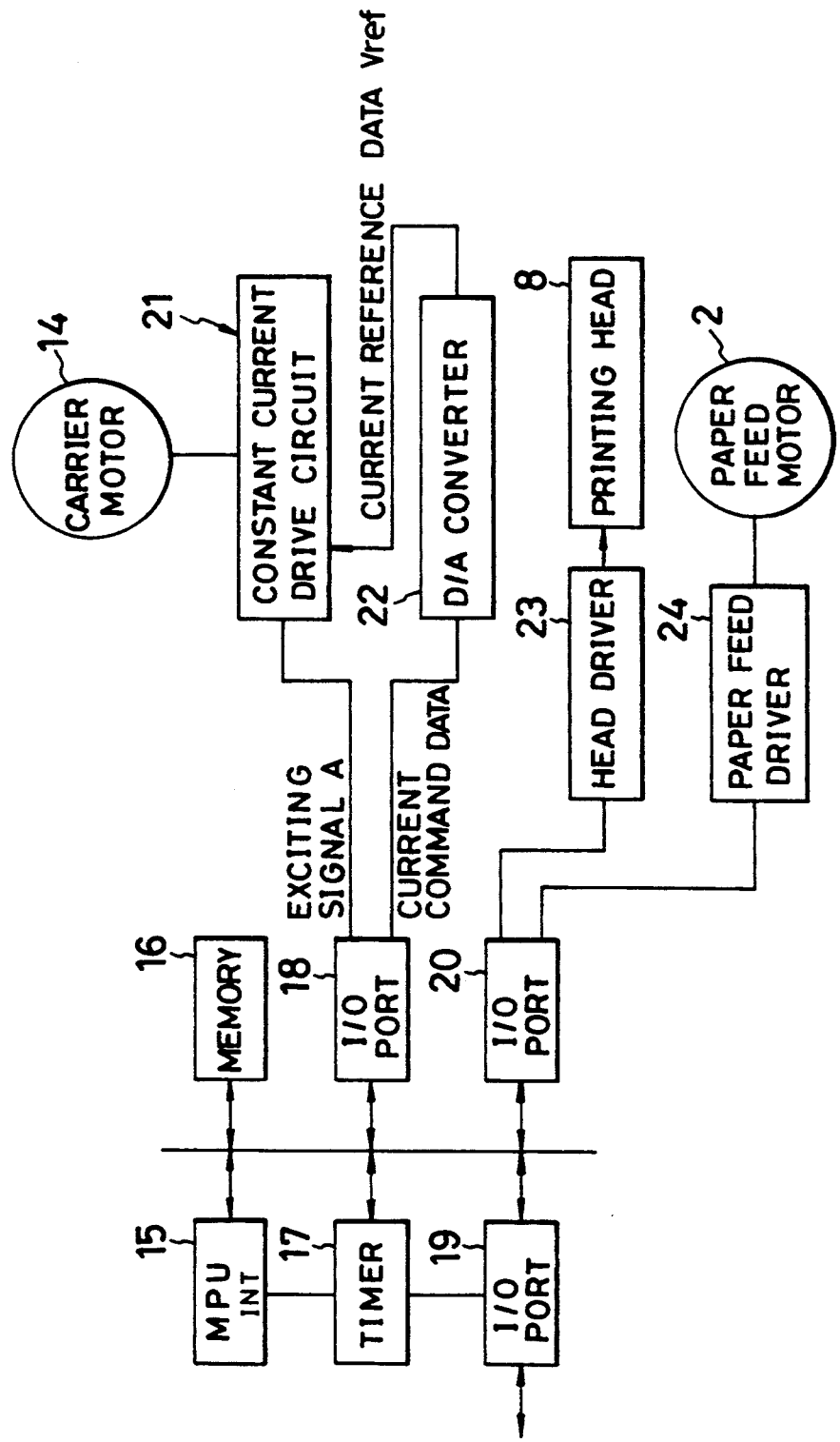
FIG. 1 is a block diagram of an electronic circuit showing a printer hardware structure with which the invention is illustratively practiced.

FIG. 1 shows an electronic circuit of a printer hardware structure with which the invention is illustratively practiced. As shown in FIG. 1, a microprocessor unit (MPU) 15, a memory (data storing means) 16, a timer 17, and a plurality of I/O ports 18, 19 and 20 are interconnected. The I/O port 18 is connected to a constant current drive circuit 21 and a D/A converter 22, the circuit 21 driving the carrier motor 14. The I/O port 20 is connected to a head driver 23 and a paper feed driver 24. The head driver 23 drives the printing head 8, and the paper feed driver 24 drives the paper feed motor 2. The I/O port 19 is connected to another driver, not shown.

The memory 16 contains, as shown Table 1 below, the current command data corresponding to the acceleration, constant speed printing and deceleration of the carrier motor for each of a plurality of speed patterns.

TABLE 1

| Speed data storage address | Speed data | Current data storage address | Current command data |
|---|---|---|---|
| [Speed 1] | SP10 | [Current 1] | Cu10 |
| +1 | SP11 | +1 | Cu11 |
| +2 | SP12 | +2 | Cu12 |
| +3 | SP13 | +3 | Cu13 |
| +n | SP1n | +n | Cu1n |
| [Speed 2] | SP20 | [Current 2] | Cu20 |
| +1 | SP21 | +1 | Cu21 |
| +2 | SP22 | +2 | Cu22 |
| +3 | SP23 | +3 | Cu23 |
| +n | SP2n | +n | Cu2n |

As indicated, the memory 16 contains speed data storage addresses paired with speed data items, and current data storage addresses paired with current command data items. A given speed data storage address is represented in the table by "Speed K+N," and the speed data item stored at that address is indicated by "SpKN." A given current data storage address is designated by "Current K+N," and the current command data item stored at that address is expressed by "CuKN." The character N stands for a given step number for the carrier motor 14. For the sake of descriptive brevity, N=1 or 2 for this embodiment. This means, for illustrative purposes herein, that there are only two speed patterns, Speed 1 and Speed 2, which denote different printing densities. Needless to say, there may be provided more speed patterns for such printing densities as draft, near-letter quality, letter quality and graphic. Each of the printing densities may also be combined with different typefaces such as pica and elite for more diverse speed patterns.

Figure 4:
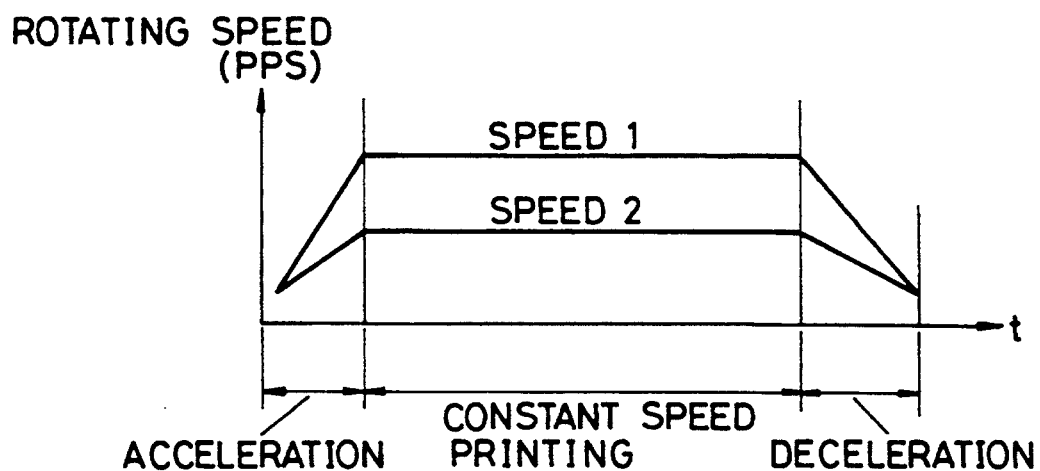
FIG. 4 is a graphic representation of speed patterns for a carrier motor in the structure of FIG. 1.
Figure 5:
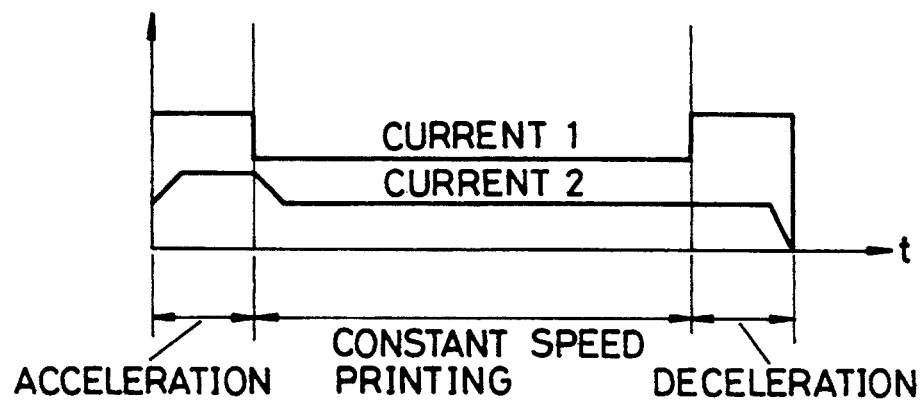
FIG. 5 is a graphic representation of current command patterns for the carrier motor.

FIG. 4 is a graphic representation of two speed patterns (Speed 1, Speed 2) for the carrier motor 14. The current command patterns corresponding to these speed patterns and directed to the carrier motor 14 are shown graphically in FIG. 5.

Figure 2:
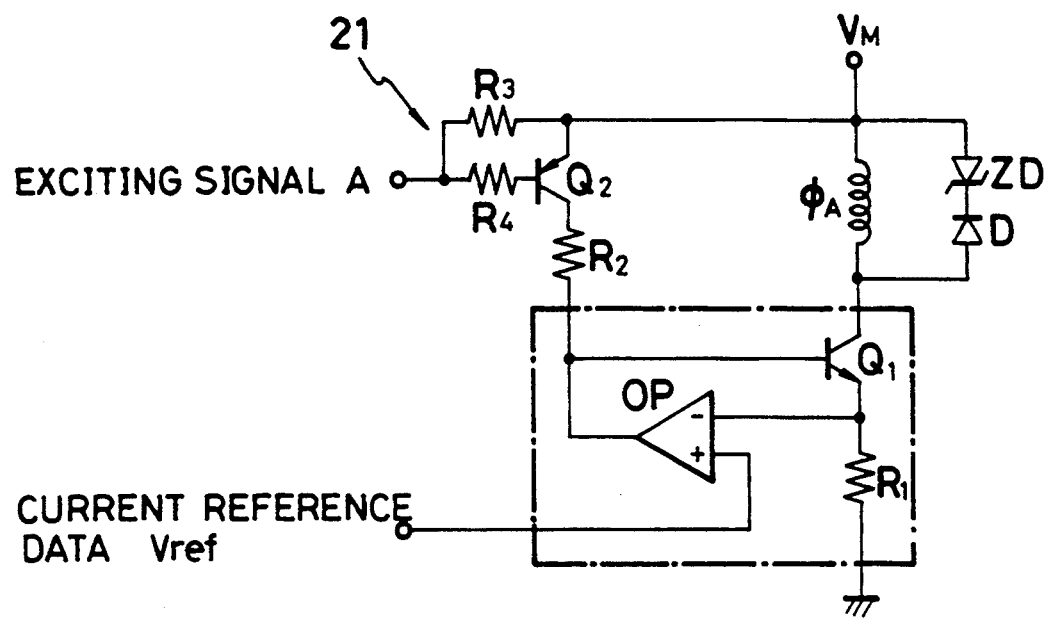
FIG. 2 is a circuit diagram of a constant current drive circuit in the structure of FIG. 1.

FIG. 2 depicts circuit details of the constant current drive circuit 21. Below is a description of the constant current drive circuit 21 as it operates to drive the carrier motor 14 in single phase (A phase). In FIG. 2, a constant current circuit 25 is composed of a current detecting resistor $R_1$, an operation amplifier OP and a transistor $Q_1$. An A-phase coil $\phi_A$ for the carrier motor 14 is interposingly provided between a power source $V_M$ and the transistor $Q_1$. Across the coil $\phi_A$ are a Zener diode ZD and a diode D connected in series to absorb back electromotive force. A transistor Q2 and resistors $R_2$, $R_3$ and $R_4$ constitute a circuit that converts the level of an exciting signal A from the I/O port 18 for input to the constant current circuit 25.

Referring to FIGS. 1 and 2, the MPU 15 sets the speed data from the memory 16 to the timer 17. When time is up on the timer 17, a time-up signal is input to the MPU 15 as an interrupt signal. This causes the carrier motor 14 to advance. That is, the exciting phases are switched. Upon entry of the interrupt signal into the MPU 15, the speed data for the next exciting phase switching is set from the memory 16 to the timer 17. This starts the timer 17 and simultaneously causes the MPU 15 to retrieve from the memory 16 the current command data in effect at the time. The retrieved data is transferred to a latch in the I/O port 18. When output from the I/O port 18, the current command data is converted by the D/A converter 22 to a current reference voltage Vref that is proportionate to the output level. The current reference voltage Vref is input to the operation amplifier OP of the constant current drive circuit 21. At this point, the coil $\phi_A$ of the carrier motor 14 is driven by the power source $V_M$ when the exciting signal A is brought Low. The current needed to drive the coil $\phi_A$ is controlled in accordance with the current reference voltage Vref.

FIG. 6 is a flowchart of the steps constituting a routine for starting the carrier motor 14. As mentioned, the carrier motor starting routine when started causes the MPU 15 to retrieve from the memory 16 the first value of the speed data corresponding to the speed pattern (Speed 1 or 2). The retrieved first value is set to the timer 17. The current command data corresponding to the address represented by the first value is set to the latch, not shown, of the I/O port 18. This sets a motion amount (i.e., step count) counter. The setting of the counter is followed by the execution of an interrupt handling (INT) routine (FIG. 7) for advancing the carrier motor. When this routine is executed, the speed data held in the memory 16 as per the speed pattern determined by another process, not described, is set consecutively to the timer 17 in synchronism with the clock signal. At the same time, the current command data is set consecutively to the latch of the I/O port 18. This causes the carrier motor 14 to advance through exciting phase switching. The interrupt handling process continues until the motion amount counter reaches zero. When the whole process is completed (i.e., zero is reached on the motion amount counter), the carrier motor 14 comes to a stop.

As described, the invention when embodied allows the carrier motor 14 to be supplied, in its acceleration, constant speed printing or deceleration mode, with current which derives from a single power source VM and which corresponds to any one of a plurality of speed patterns. Where the carrier 9 moves at any of different speeds for different printing qualities such as draft and letter quality, the carrier motor 14 is driven on a current that generates a minimally required torque level. The energy efficiency of the power supply is improved so that the carrier motor 14 will be protected from heating. Because the current to the carrier motor 14 is controlled upon acceleration and deceleration, dumping is suppressed during constant speed printing. Another benefit is that the invention minimizes the noise emanating from the stepping motion of the carrier motor 14 during constant speed printing.

As described above, the invention provides a printer carrier driving method for use with a printer carrier driving apparatus. The apparatus comprises a printing head, a carrier carrying the printing head, a carrier motor rotating in forward and reverse directions, a constant current drive circuit, data storing means and a clock generator. The carrier is reciprocated in movement by the carrier motor. The carrier motor is connected via the constant current drive circuit with a power source. The inventive method comprises the steps of: having the data storing means store the current command data corresponding to the acceleration, constant speed printing and deceleration of the carrier motor; latching the current command data in synchronism with the pulses generated by the clock generator; converting the latched current command data to a current reference voltage; and varying the output current of the constant current drive circuit in accordance with the current reference voltage. The current command data stored in the data storing means is latched consecutively in synchronism with the pulses from the clock generator. The latched current command data is converted to the current reference voltage. The carrier motor is then driven by varying the output current of the constant current drive circuit in accordance with the current reference voltage. Changing the current command data makes it possible to adjust freely the torque of the carrier motor during its acceleration and deceleration. In this manner, the carrier motor is driven on a current that generates a minimally required torque level. Because the power supply is boosted in terms of energy efficiency, the excess heating of the carrier motor is suppressed. With the current to the carrier motor controlled upon acceleration and deceleration, dumping is suppressed during constant speed printing. In addition, the inventive method minimizes the noise resulting from the stepping motion of the carrier motor during constant speed printing.

The invention also provides a method that involves having the data storing means store, for each of a plurality of speed patterns, the current command data corresponding to the acceleration, constant speed printing and deceleration of the carrier motor. Thus when the carrier speed is changed for each of different printing modes of different printing densities, this method sets the torque of the carrier motor properly in keeping with the carrier speed during acceleration, constant speed printing or deceleration.

As many apparently different embodiments of this invention may be made without departing from the spirit and scope thereof, it is to be understood that the invention is not limited to the specific embodiments thereof except as defined in the appended claims.

What is claimed is:

1. A driving method for driving a printer carrier comprising the steps of:
    storing current command data designating acceleration, constant speed printing and deceleration of a printer carrier motor for a plurality of speed patterns, each of the plurality of speed patterns designating a different print density;
    selecting current command data of one of said plurality of speed patterns to control said printer carrier motor;
    latching said current command data of the selected speed pattern in a latch means;
    converting the latched current command data of the selected speed pattern into a current reference voltage; and
    varying an output current of a constant current drive circuit in accordance with the current reference voltage.

2. The driving method according to claim 1, wherein the step of converting the latched current command data of the selected speed pattern into a current reference voltage comprises digital to analog conversion of the latched current command data.

3. The driving method according to claim 1, wherein the step of latching said current command data of the selected speed pattern in a latch means is synchronized with pulses output from a clock generator.

4. A driving system for driving a printer carrier comprising:
    means for storing current command data designating acceleration, constant speed printing and deceleration of a printer carrier motor for a plurality of speed patterns, each of the plurality of speed patterns designating a different print density;
    means for selecting current command data of one of said plurality of speed patterns to control said printer carrier motor;
    a latch for latching said current command data of the selected speed pattern;
    means for converting the latched current command data of the selected speed pattern into a current reference voltage; and
    means for varying an output current of a constant current drive circuit in accordance with the current reference voltage.

5. The driving system according to claim 4, wherein the means for converting the latched current command data of the selected speed pattern into a current reference voltage comprises a digital to analog converter for converting the latched current command data.

6. The driving system according to claim 4, wherein the latch for latching said selected current command data of the selected speed pattern is synchronized with pulses output from a clock generator.

7. The apparatus according to claim 4, wherein the constant current drive circuit comprises:
    an operational amplifier;
    a current detecting resistor connected to a first input of the operational amplifier; and
    a transistor connected between the first input of the operational amplifier and an output of the operational amplifier.

* * * * *